United States Patent [19]

Zeff et al.

[11] Patent Number: 4,849,114

[45] Date of Patent: * Jul. 18, 1989

[54] OXIDATION OF TOXIC COMPOUNDS IN WATER

[75] Inventors: Jack D. Zeff, MarinaDelRey; Eriks Leitis, Canoga Park, both of Calif.

[73] Assignee: Ultrox International, Santa Ana, Calif.

[ * ] Notice: The portion of the term of this patent subsequent to Dec. 20, 2005 has been disclaimed.

[21] Appl. No.: 163,978

[22] Filed: Mar. 4, 1988

Related U.S. Application Data

[63] Continuation-in-part of Ser. No. 161,328, Feb. 18, 1988, Pat. No. 4,792,407, which is a continuation of Ser. No. 934,693, Nov. 25, 1986, abandoned.

[51] Int. Cl.$^4$ .............................. C02F 1/32; C02F 1/78
[52] U.S. Cl. .................................. 210/747; 210/748; 210/759; 210/760; 204/158.2; 422/24; 422/186.3
[58] Field of Search ............... 210/747, 748, 759, 760; 422/24, 186.3, 121, 186.07, 186.08, 186.1, 236; 204/158.2

[56] References Cited

U.S. PATENT DOCUMENTS

| | | | |
|---|---|---|---|
| 3,920,547 | 11/1975 | Garrison | 210/760 |
| 4,141,830 | 2/1979 | Last | 210/760 |
| 4,230,571 | 10/1980 | Dudd | 210/760 |
| 4,332,687 | 6/1982 | Daignault | 210/759 |
| 4,512,900 | 4/1985 | Macur | 210/760 |
| 4,599,179 | 7/1986 | Pincon | 210/760 |
| 4,642,134 | 2/1987 | Van Antwerp | 210/760 |

FOREIGN PATENT DOCUMENTS

| | | | |
|---|---|---|---|
| 51-31052 | 3/1976 | Japan | 210/760 |
| 53-27264 | 3/1978 | Japan | 210/760 |
| 58-52598 | 3/1983 | Japan | 210/760 |
| 58-55088 | 4/1983 | Japan | 210/760 |
| 60-41999 | 9/1985 | Japan | 210/760 |
| 710981 | 1/1980 | U.S.S.R. | 210/760 |
| 880994 | 11/1981 | U.S.S.R. | 210/760 |

OTHER PUBLICATIONS

Kuo, "Indification of End Products Resulting From Ozonation and Chlorination of Organic Compounds Commonly Found in Water", Environmental Science and Technology, vol. 11, No. 13, Dec. 1977, pp. 1177–1181.

Walling, The Oxidation of Alcohols by Fenton's Reagent, Journal of the American Chemical Society, Aug. 25, 1971, pp. 4275–4280.

*Primary Examiner*—Ernest G. Therkorn
*Attorney, Agent, or Firm*—Sheldon & Mak

[57] ABSTRACT

A method of oxidizing toxic compounds including halogenated and/or partially oxygenated hydrocarbons and hydrazine and hydrazine derivatives in aqueous solutions by using in combination ozone, hydrogen peroxide and ultraviolet radiation is improved.

9 Claims, No Drawings

OXIDATION OF TOXIC COMPOUNDS IN WATER

CROSS REFERENCE TO RELATED APPLICATIONS

This application is a continuation-in-part of patent application U.S. Ser. No. 161,328, filed Feb. 18, 1988, now U.S. Pat. No. 7,792,407, which is a file wrapper continuation of U.S. Ser. No. 934,693 filed Nov. 25, 1986 and now abandoned.

FIELD OF THE INVENTION

The present invention relates generally to detoxification of hazardous materials and more particularly, to removal of toxic compounds from aqueous solutions.

BACKGROUND OF THE INVENTION

At this time there is a critical national need for removing toxic compounds from groundwater, surface water and industrial waste waters without transferring these compounds to the atmosphere or to burial sites. At present, oxidation by incineration or chemical means is the only method of accomplishing true detoxification rather than mere displacement of these organic toxicants into the atmosphere or to another medium.

Incineration of dilute aqueous solutions of organic components is costly due to the energy required for the evaporation of water. Moreover, incineration may cause the formation of toxic by-products, such as dioxin derivatives, in the off-gases. Chemical oxidation processes to treat contaminated water include use of such substances as for example, potassium permanganate, chlorine dioxide, chlorine, hydrogen peroxide, or ozone. Additionally, oxidation may be enhanced using ultraviolet light (UV) in conjunction with any of these substances except permanganate.

Chemical detoxification methods are in commercial use for wastewaters and some ground waters. These methods present attendant disadvantages, however. For example, potassium permanganate produces manganese dioxide as a by-product during oxidation. Chlorine, and in some instances, chlorine dioxide, forms chlorinated organic compounds. Moreover, hydrogen peroxide plus ferrous sulfate (Fenton's reagent) produces soluble and insoluble iron residues.

Ozonation without UV light partially oxidizes benzene derivatives to mono- and di-basic acids which are biodegradable, but does not oxidize saturated halogenated compounds. Oxidation with hydrogen peroxide and UV light is useful for oxidizing a number of organic compounds, but in many cases the rates of oxidation are significantly slower than when using UV/$O_3$. While ozone combined with UV enhancement has been found to be cost-effective and practical for non-volatile unsaturated chlorinated hydrocarbons and a number of benzene derivatives, certain saturated chlorinated and oxygenated compounds, such as the pervasive pollutants methylene chloride and methanol, have been found to be refractory to UV-ozonation.

In addition certain types of fuels, such as rocket fuels, contain hydrazine and hydrazine derivatives including monomethylhydrazine (MMH) and unsymmetrical dimethylhydrazine (UDMH) as well as mixtures of these compounds. During the course of procurement, storage, transport and testing of such hydrazine fuels, there is a possibility for environmental contamination, for example of water sources. Therefore, there is a need for treatment technologies for contaminated water generated at fuel production sites and/or from spilled fuels. The use of ozone and ultraviolet light to treat aqueous solutions containing hydrazine, MMH and UDMH has been investigated. (Sierka et al., Report September 1978, Civil and Environmental Engineering Development Office, (CEEDO), Tyndall Air Force Base, Fla.; and Jody et al., "Oxidation of Hydrazines and Their Associated Impurities", available from the Aerospace Corporation, Los Angeles, Calif.).

The toxicity and carcinogenicity of most compounds with a N-nitroso (N-N=O) structure is well established (Druckery et al., Krebsforsch, 69:103 (1967); Ember, *Chemical and Engineering News,* 58:20 (1980); and Tsai-Hi et al., *J. Agr. Food Chem.,* 19:1267 (1971)). Nitrosamines, one group of N-nitroso compounds, are formed when amines react with nitrogen oxides and/or nitrite ions (Ember, supra). Because of ready availability of precursors, presumably $(CH_3)_2N\cdot$ and partially oxidized nitrogen species such as $NO_2-$, $NO$ and $NO_2$, dimethylnitrosamine, (DMNA) one of the more potent carcinogens in various animal species, can be formed as an intermediate during oxidation of UDMH and to a much lesser extent during oxidation of MMH. (Judeikis, "Modeling the Ozonolysis at Hydrazine Wastewater", available from the Aerospace Corporation, Los Angeles, Calif.) has proposed a general mechanism applicable to the ozonation of hydrazine derivatives concluding that oxidation of DMNA, which reaches the maximum level just as the parent hydrazines are no longer detectable, spears to be the rate limiting step in the overall ozonation of hydrazine derivatives. Because DMNA is more resistant than the parent compound (UDMH) to oxidation it persists in the solution of oxidized UDMH solutions after the parent compound has been completely destroyed.

Thus, there is a long standing need for powerful and practical methods for removing a wide spectrum of toxic compounds from water. Such a method should provide both a highly effective and cost-effective means of detoxifying hazardous compounds. The present application fulfills these needs and provides related advantages as well.

SUMMARY OF THE INVENTION

Accordingly, the present invention provides a method of treating halogenated and/or partially oxygenated hydrocarbons and/or hydrazine and hydrazine derivatives in aqueous solutions by using in combination, ozone ($O_3$), hydrogen peroxide ($H_2O_2$) and ultraviolet radiation (UV). The addition of hydrogen peroxide to the UV/ozone combination results in a greatly increased efficiency of oxidation, particularly for compounds which are resistant to oxidation by ozone and UV. Such increased efficacy reflects a synergistic effect which may be related to the intermediate production of $O_3$ or hydroperoxide ($HO_2\cdot$) or hydroxy ($OH\cdot$) radicals which set in motion rapid oxidation reactions.

To carry out the method, water containing halogenated and/or partially oxygenated hydrocarbon contaminants and/or hydrazine and hydrazine derivatives is exposed to $O_3$, $H_2O_2$ and UV radiation simultaneously.

Alternatively, the water may be first exposed to UV and $H_2O_2$ and subsequently $O_3$ is added thereto. For treatment of hydrazine compounds, the use of a 1:1 molar ratio of $H_2O_2:O_3$ plus UV results in enhanced oxidation efficiency. The temperature of the solution may be elevated above ambient temperature.

The principal objective of the present invention is (a) to provide a new and useful method for decontaminating waters containing hydrocarbons, halogenated hydrocarbons and partially oxidized hydrocarbons, and/or hydrazine and hydrazine derivatives; (b) to oxidize or partially oxidize these contaminants efficiently and economically to simple compounds such as carbon dioxide, water, and halides; and (c) to oxidize less toxic partially oxidized compounds such as aldehydes, dibasic organic acids and the like, depending upon their nature, their toxicity, the source of disposal, whether a receiving water, such as a stream, river, etc., or to a biotreatment process either on site or to a publicly owned treatment works.

Other features and advantages of the present invention will become apparent from the following, more detailed description which illustrates, by way of example, the principles of the invention.

DETAILED DESCRIPTION OF THE PREFERRED EMBODIMENT

The present invention provides a highly efficient and effective method for oxidizing toxic compounds in aqueous solutions, which has particular application to oxidizing halogenated and/or partially oxygenated hydrocarbon contaminants and/or hydrazine and hydrazine derivatives in water. The method comprises exposing contaminated water to $H_2O_2$, $O_3$, and UV. When ground water or wastewater contains significant concentrations of hydrocarbon contaminants such as methylene chloride or methanol, these compounds are difficult to oxidize by conventional methods. With the method of the present invention, the water is exposed to $H_2O_2$, $O_3$ and UV, preferably simultaneously, or alternatively preliminarily with $H_2O_2$ and UV, followed by the addition of $O_3$. The method is effective for oxidation of a wide spectrum of hydrocarbons, including halogenated and partially oxygenated hydrocarbons, whether aromatic or aliphatic.

The present method also has application to oxidizing hydrazine derivatives in water. The method comprises exposing the contaminated water to $O_3$, $H_2O_2$, and UV. When wastewater or groundwater contains high concentrations (5,000 to 30,000 ppm) of hydrazine derivatives such as UDMH, these compounds are difficult to oxidize even with oxidation methods such as UV-ozonation. In the method of the present invention, the water is exposed to $O_3$, $H_2O_2$ and UV. The method is effective for oxidation of substituted hydrazines and nitrosamines, especially dimethylnitrosamine (DMNA) the major intermediate formed during oxidation of UDMH. This method is also well suited for the oxidation of partially oxygenated hydrocarbons which are produced during oxidation of substituted hydrazines.

EXAMPLE I

OXIDATION OF METHANOL

Samples of distilled water (Arrowhead Co., P.O. Box 2293, Los Angeles, Calif. 90051 0293) containing the equivalent of 200 mg methanol/liter were treated with various combinations of $O_3$, $H_2O_2$ and UV. For each such sample, two liters of the aqueous methanol solution was placed in an 82×485 mm pyrex glass cylindrical reaction vessel which was sealed at the top. UV was provided by a centrally located low pressure mercury arc lamp (G37T6VH) inside a 24 mm O.D. quartz sheath (both from Voltarc Tubes, Inc., Fairfield, Conn.), (lamp size=40 watts; ultraviolet output=14.3 watts; tube diameter=15 mm; tube material=quartz). The lamp assembly was suspended 15 mm above the bottom of the cylinder to leave room for a magnetic stirring bar.

Hydrogen peroxide was introduced into the reaction vessel through an opening at the top. 0.7 mL of 30% $H_2O_2$ were supplied at 5 minute intervals over 20 minutes. Ozone was generated from welding grade oxygen using a Model 8341 ozonator (Matheson Gas Products Company, Lindhurst, N.Y.). 2% ozone in oxygen was bubbled in at bottom of the cylinder through a coarse frittered glass disc at a rate of 62 mg/min. The solution was stirred during the oxidation with a magnetic stirring bar. The effluent oxygen stream was passed through a solvent trap to collect materials being stripped off.

The rate of methanol oxidation was determined by gas-liquid chromatography (glc) using a model 340 ALP gas chromatograph manufactured by Antek Instruments, Inc., Houston, Tex. The oxidized methanol solutions were injected directly on a 6 ft. × ⅛ in. stainless steel column containing 10% Pennwalt +4% KOH on 80/100 mesh Gas Chrom R. The column was operated isothermally at 100° C.

The results of the procedures are presented in Table 1. The resulting decrease in TOC using the combination of UV, $H_2O_2$ and $O_3$ is greater than ten times that achieved with treatment by use of UV, $H_2O_2$ or $O_3$ alone or in combinations of two.

TABLE 1

Oxidation of Methanol
The methanol concentration was 200 ppm at zero time.
volume of methanol solution = 2000 ml, $O_3$ concentration
in the $O_2$-$O_3$ feed gas = 3.6%, $O_2$-$O_3$ flow to deliver 70 mM
30 min = 2.2 L/min.

| Oxidation Conditions | No. of Runs | Time (min) | $O_3$ (mM) | $H_2O_2$ (mM) | TOC (ppm) |
|---|---|---|---|---|---|
| Control | 1 | 0 | — | — | 75 |
|  |  | 30 | — | — | 75 |
| UV | 1 | 0 | — | — | 75 |
|  |  | 30 | — | — | 75 |
|  |  | 30 | — | — | 75 |
| UV/$H_2O_2$ | 1 | 0 | — | — | 75 |
|  |  | 30 | — | 70 | 63 |
| $H_2O_2$ | 1 | 0 | — | — | 75 |
|  |  | 30 | — | 70 | 68 |
| $O_3$ | 1 | 0 | — | — | 75 |
|  |  | 30 | 70 | — | 47 |
| $O_3$/$H_2O_2$ | 1 | 0 | — | — | 75 |
|  |  | 30 | 39 | 31 | 31 |
| UV/$O_3$ | 1 | 0 | — | — | 75 |
|  |  | 30 | 70 | — | 27 |
| UV/$O_3$/$H_2O_2$ | 2 | 0 | — | — | 75 |
|  |  | 30 | 39 | 31 | 1.2. ± 0.25 |
| UV/$O_3$/$H_2O_2$ | 1 | 0 | — | — | 75 |
|  |  | 30 | 78 | 62 | 2.1 |

EXAMPLE II

OXIDATION OF METHYLENE CHLORIDE

Methylene chloride oxidation was carried out using the procedure of Example I, except that the feed samples contained 100 mg of methylene chloride/l, time of oxidation=25 min., and each water sample to be oxidized was 1800 ml. 0.15 ml of 30% $H_2O_2$ was added to the methylene chloride solution in the reaction vessel at the start. Ozone was added at a rate of 5.2 mg/min. The rate of methylene chloride oxidation was determined by hexane extraction and gas liquid chromatography using a Varian Aerograph Model 144010-00 gas chromatograph equipped with an electron capture detector ($^{63}$Ni). An aliquot of the oxidized water sample diluted to contain no more than 10 ppm of methylene chloride was combined with 2 ml of high purity hexane (Burdick & Jackson, Muskegon, Mich.) in a 40 ml vial closed with a teflon septum lined screw cap. The contents of the vial were shaken vigorously for 1 min. and after separation of the phases one μl of the hexane extract was withdrawn through the teflon lined septum and injected on a 10 m×0.53 nm i.d. wide bore capillary column coated with FSOT Superox, 1.2 μm. The column was operated isothermally at 30° C. The results are presented in Table 2. As in Example I, the lowest level of nonoxidized methylene chloride was obtained in those trials in which UV, $H_2O_2$ and $O_3$ were used in combination.

TABLE 2

Oxidation of Methylene Chloride

| Oxidation Conditions | No. of Runs | Time (min) | Oxidant Dose $O_3$ (mM) | Oxidant Dose $H_2O_2$ (mM) | $CH_2Cl_2$ found solution (ppm) | $CH_2Cl_2$ found Trap % |
|---|---|---|---|---|---|---|
| Control | 1 | 0 | — | — | 100 | — |
|  |  | 10 | — | — | 100 |  |
|  |  | 25 | — | — | 100 |  |
| UV | 1 | 0 | — | — | 100 | — |
|  |  | 10 | — | — | 59 |  |
|  |  | 25 | — | — | 42 |  |
| UV/$H_2O_2$ | 1 | 0 | — | — | 100 | — |
|  |  | 10 | — | 4.0 | 46 |  |
|  |  | 25 | — | 10 | 17 |  |
| $H_2O_2$ | 1 | 0 | — | — | 100 | — |
|  |  | 10 | — | 4.0 | 38 |  |
|  |  | 25 | — | 10 | 22 |  |
| $O_3$ | 1 | 0 | — | — | 100 | 1.2 |
|  |  | 10 | 4.0 | — | 44 |  |
|  |  | 25 | 10 | — | 18 |  |
| $O_3$/$H_2O_2$ | 1 | 0 | — | — | 100 | 0.86 |
|  |  | 10 | 2.7 | 1.3 | 32 |  |
|  |  | 25 | 6.7 | 3.3 | 21 |  |
| UV/$O_3$ | 2 | 0 | — | — | 100 | 0.43 |
|  |  | 10 | 4.0 | — | 36 ± 6 |  |
|  |  | 25 | 10 | — | 16 + 2 |  |
| UV/$O_3$/$H_2O_2$ | 2 | 0 | — | — | 100 | 0.46 |
|  |  | 10 | 2.7 | 1.3 | 18 ± 3.7 |  |
|  |  | 25 | 6.7 | 3.3 | 5.2. ± 0.8 |  |
| UV/$O_3$/$H_2O_2$ | 1 | 0 | — | — | 100 | 0.35 |
|  |  | 10 | 5.4 | 2.6 | 19 |  |
|  |  | 25 | 13.4 | 6.6 | 7.6 |  |

[1]Volume of $CH_2Cl_2$ solution oxidized = 1800 ml; $O_3$ concentration = 2%; $O_2$–$O_3$ flow to deliver 10 mM $O_3$/25 min = 0.5 l/min.

EXAMPLE III

OXIDATION OF WOOD PRODUCTS MANUFACTURER WASTEWATER

Wood products manufacturer wastewater oxidation was carried out using the procedure of Example I except that the feed samples contained 29,800 Pt-Co color units and each water sample to be oxidized was 1900 ml. 1.15 ml of 30% $H_2O_2$ were supplied at 5 min. intervals over 20 min. Ozone was added at a rate of 40 mg/min. The oxidized wastewater samples were diluted as needed to give the same color intensity.

The results are shown in Table 3.

TABLE 3

Oxidation of a Wastewater to Remove Color Bodies from a Wood Products Manufacturer with UV/$O_3$/$H_2O_2$.

Batch Operation

| Run No. | Oxidation conditions Oxidant dose | Time | Dilution required to achieve the same color intensity |
|---|---|---|---|
|  | Feed | 0 | 1:99 |
| 1 | UV/$O_3$/$H_2O_2$ $O_3$ = 50.0 mM $H_2O_2$ = 100 mM Total = 150 mM | 60 min. | None |
| 2 | UV/$O_3$/$H_2O_2$ $O_3$ = 100 mM $H_2O_2$ = 21 mM Total = 121 mM | 60 min. | 1:1 |
| 3 | UV/$O_3$/$H_2O_2$ $O_3$ = 50 mM $H_2O_2$ = 50 mM Total = 100 mM | 60 min. | 1:4 |
| 4 | UV/$O_3$ $O_3$ = 100 mM | 60 min. | 1:5 |

EXAMPLE IV

OXIDATION OF CHEMICAL PLANT WASTEWATER

Wastewater from a chemical plant containing 700 ppm of 1,4-dioxane, 1000 ppm of ethylene glycol and 1000–5000 ppm acetaldehyde was subjected to comparative oxidation using the combination of UV, $H_2O_2$, and $O_3$. The procedure followed was that given in Example I except that the reaction time was 120 min., 35 ml of 30% of $H_2O_2$ were added gradually within the first 90 min and the rate of ozone addition was 205 mg/min. The decrease in 1,4-dioxane concentration was determined by gas liquid chromatography as described in Example I, except that the glc column was operated isothermally at 140° C.

The results are presented in Table 4. The combination of UV, $H_2O_2$ and $O_3$ resulted in a two to five fold reduction in dioxane over that achieved with UV and $O_3$.

TABLE 4

Oxidation with UV/$O_3$/$H_2O_2$ on the Laboratory Bench of a Wastewater from a Chemical Plant

| Run[1] No. | Time (min) | Reaction Conditions | Dioxane found (ppm) |
|---|---|---|---|
| 1 | 0 | UV/$O_3$, 124 mg | 700 |
|  | 60 | $O_3$/min | 500 |
|  | 90 |  | 380 |
|  | 120 |  | 260 |
| 2 | 0 | UV/$O_3$, 205 mg | 700 |
|  | 60 | $O_3$/min | 420 |
|  | 90 |  | 310 |
|  | 120 |  | 190 |
| 3 | 0 | UV/$O_3$/$H_2O_2$ | 700 |
|  | 60 | 205 mg $O_3$/min | 300 |
|  | 90 | 35 ml of 30% $H_2O_2$ | 170 |
|  | 120 | add $H_2O_2$ within 90 min. | 50 |
| 4 | 0 | UV/$O_3$/$H_2O_2$ | 700 |
|  | 60 | 124 mg $O_3$ min | 320 |
|  | 90 | 70 ml of 30% $H_2O_2$ | 180 |
|  | 120 | add $H_2O_2$ within 90 min. | 90 |

[1]2000 ml Volume, Batch Operation

EXAMPLE V

OXIDATION OF CHEMICAL PLANT GROUNDWATER

Comparative oxidations of groundwater containing a variety of organic compounds were performed using UV, $H_2O_2$ and $O_3$ and UV and $O_3$. The procedure followed was that described in Example I except that the time was 60 min., 3.2 ml of 30% $H_2O_2$ were added at the start of the oxidation and the ozone dose was 11 mg/min. The concentration of the organic compounds in the feed and in the oxidized groundwater was determined by Montgomery Laboratories, Pasadena, Calif. using gas liquid chromatography/mass spectrometry. The results are presented in Table 5.

TABLE 5

Oxidation of Groundwater on the Laboratory Bench from a Chemical Plant with $UV/O_3/H_2O_2$

| Compound | Feed (ppb) | $UV/O_3$* (ppb) | $UV/O_3/H_2O_2$** (ppb) |
|---|---|---|---|
| Vinyl chloride | 130,000 | N.D. | N.D. |
| Methylene chloride | 13,000 | N.D. | N.D. |
| 1,1-DCE | 7,600 | 10 | 53 |
| 1,1-DCA | 7,300 | N.D. | N.D. |
| Trans 1,2-DCE | 130,000 | N.D. | 62 |
| $CHCl_3$ | 480 | 11 | 35 |
| 1,2-DCA | 95,000 | 5,300 | 6,600 |
| TCE | 3,500 | N.D. | N.D. |
| PCE | 200 | N.D. | N.D. |
| Chlorobenzene | 2,900 | 16 | N.D. |
| Benzene | 260 | N.D. | N.D. |
| Toluene | 10,000 | N.D. | N.D. |
| Ethylbenzene | 1,100 | N.D. | N.D. |
| Xylene | 4,500 | 14 | 14 |
| Bromoform | — | 7,900 | 160 |
| $CHBrCl_2$ | — | 150 | N.D. |

*60 min, 27.5 mM $O_3$ (= 22 mg $O_3$/min/1.8 L)
**60 min, 11 mg $O_3$/min (14 mM), 28 mM $H_2O_2$ (3.2 ml 30%)
N.D. non-detectable

EXAMPLE VI

OXIDATION OF PAINT STRIPPING WASTEWATER

Paint stripping wastewater containing methylene chloride was pretreated to remove chromate ions and paint chips. The pretreatment consisted of using sodium meta bisulfite to reduce the chromate ion to $Cr^{+++}$ and then adding sodium hydroxide and a anionic polymer solution to form a rapidly settled $Cr(OH)_3$ precipitate. Three (3) ml of 0.76% $Na_2S_2O_5$ were added to 100 ml of the wastewater adjusted to pH 4. After 30 min NaOH was added to pH 8.5 and then a anionic polymer solution was added to give 0.5 ppm of the anionic polymer. The precipitated $Cr(OH)_3$ was filtered off and the filtrate oxidized with $UV/H_2O_2/O_3$ according to the procedure given in Example I except that samples were obtained at 15 min. intervals. The total time for the oxidation was 60 min., the volume of the wastewater was 1800 ml, the total $H_2O_2$ dose was 4.7 ml of 30% $H_2O_2$, and the ozone dose was 21.5 mg/min. The methylene chloride decrease was measured as described Example II.

TABLE 6

Bench Test Results on Pretreated Paint Stripping Wastewater[1]

| Reaction Time (min) | Methylene Chloride (ppm) |
|---|---|
| 0 | 70 |
| 15 | 2.1 |
| 30 | 0.49 |
| 45 | 0.02 |
| 60 | N.D. |

N.D. non-detectable
[1]Conditions: $O_2$-$O_3$ flow = 0.75 L/min at 2% (wt) $O_3$, 1.8 L batch of pretreated paint stripping wastewater, $H_2O_2$ dose = 2.6 ml at 30%/1 liter wastewater, 14.9 mM $O_3$/12.7 mM $H_2O_2$.

EXAMPLE VII

OXIDATION OF UNSYMMETRICAL DIMETHYLHYDRAZINE

Samples of distilled water (Arrowhead Co., Los Angeles, Calif.) containing the equivalent of 5 g of UDMH/liter were treated with $O_3$, $H_2O_2$ and UV, with $O_3$ and $H_2O_2$ in a molar ratio of 1:1. For each such sample, two liters of the aqueous UDMH solution were placed in an 82 ×485 mm Pyrex glass cylindrical reaction vessel. UV was provided by a centrally located low pressure mercury arc lamp (G37T6VH, lamp size=40 watts; ultraviolet light output=14.3 watts; tube diameter=15 mm inside a 24.mm O.D. quartz sheath (both from Voltarc, Inc.) The lamp assembly was suspended 15 mm above the bottom of the cylinder to provide room for a magnetic stirring bar.

Hydrogen peroxide ($H_2O_2$) was introduced into the reaction vessel from a burette through glass tubing extending 200 mm below the surface of the solution at a rate of 8.6 ml of 30% $H_2O_2$/hour. Ozone ($O_3$) was generated from welding grade oxygen using a Model 8341 ozonator (Matheson Gas Products Company, Lindhurst, N.Y.). 2% Ozone in oxygen was bubbled in at bottom of the cylinder through a coarse drilled fitted glass disc at a rate of 61 mg/min. The solution was stirred during the oxidation process with a magnetic stirring bar.

The rate of UDMH oxidation was determined by calorimetry via reduction of phosphomolybdic acid according to the following procedure. Phosphomolybdic acid was prepared by combining 4 g of NaOH in 40 ml $H_2O$ with 7 g molybdic acid and 10 g of sodium tungstate. The mixture was boiled for 30 min., cooled and diluted to 70 ml. Twenty-five (25) ml of 83% $H_3PO_4$ was added to the solution which was then diluted to 1 liter. Two (2) ml of phosphomolybdic acid reagent was added to a 6 ml sample of UDMH containing up to 0.05 mg of UDMH and heated for 50 minutes at 98° C. The solution was cooled to room temperature, then diluted to 10 ml and read on a spectrophotometer at 420 nm.

The dimethylnitrosamine (DMNA) level in the UDMH solution being oxidized was determined by the Nitrosamines Method (EPA method 607, (in Federal Register, Part VIII, Environmental Protection Agency, 40 CFR 136, Guidelines Establishing Test Procedures For the Analysis of Pollutants Under the Clean Water Act, pp. 81–88, EPA, Washington, DC. (1984)). The water samples were extracted with methylene chloride, the extract dried, concentrated, subjected to Florisil column cleanup if needed, and the DMNA level was estimated by gas-liquid chromatography (glc) using a Model 8500 gas chromatograph (Perkin-Elmer Corporation, Norwalk, Conn.). The extracts were injected on a 25 ft.×⅛ in. stainless steel column (Alltech Assoc., Inc., Applied Science Labs, Deerfield, Ill.) containing 10% OV-101 and 0.1% C1500 on 100/120 mesh Chrom. WHP. The column oven temperature was maintained at 190° C. isothermally.

The results of the UDMH and DMNA analyses are presented in Tables 7 and 8. The resulting decrease in UDMH and DMNA using the combination of $O_3$, $H_2O_2$, and UV is at least 2.3 times greater than the decrease in UDMH and DMNA achieved with treatment by use of UV, $H_2O_2$, or $O_3$ in any combination of two treatment components, with $UV/O_3$ treatment providing the next highest reduction in UDMH and DMNA. DMNA formed during oxidation of UDMH remained in the oxidized UDMH solution after all UDMH had been destroyed. Thus, the present method provides a means of detoxifying water which contains contaminants such as rocket fuel, at rocket launch sites.

TABLE 7

Oxidation of Unsymmetrical Dimethylhydrazine (UDMH)

| Oxidation[1] Conditions | No. of Runs | Time (hrs) | $O_3$ (mM) | $H_2O_2$ (mM) | UDMH found (ppm) |
|---|---|---|---|---|---|
| $UV/O_3/H_2O_2$ | 2 | 0 | 0 | 0 | 5,000 |
|  |  | 2 | 76.5 | 76.5 | 798 |
|  |  | 3 | 114.5 | 114.5 | 78 |
| $UV/O_3$ | 2 | 0 | 0 | 0 | 5,000 |
|  |  | 2 | 153 | 0 | 528 |
|  |  | 3 | 230 | 0 | 176 |
| $O_3/H_2O_2$ | 1 | 0 | 0 | 0 | 5,000 |
|  |  | 2 | 76.5 | 76.5 | 1,105 |
|  |  | 3 | 114.5 | 114.5 | 240 |
| $UV/H_2O_2$ | 2 | 0 | 0 | 0 | 5,000 |
|  |  | 2 | 0 | 153 | 3,100 |
|  |  | 3 | 0 | 230 | 2,050 |
| UV | 1 | 0 | 0 | 0 | 5,000 |
|  |  | 3 | 0 | 0 | 5,000 |
| Control | 1 | 0 | 0 | 0 | 5,000 |
|  |  | 3 | 0 | 0 | 5,000 |

[1]The unsymmetrical dimethylhydrazine (UDMH) concentration was 5,000 ppm at zero time, volume of UDMH solution = 2,000 ml, $O_3$ concentration in the $O_2$–$O_3$ feed gas = 2%, $O_2$–$O_3$ flow to deliver 76.5 mM (3660 mg) $O_3$/hour/2 L of solution = 2 L/min; the $H_2O_2$ dose to deliver 76 mM (2,580 mg) $H_2O_2$/hour/2 L was 8.6 ml 30% $H_2O_2$/hour.

TABLE 8

Oxidation of Dimethylnitrosamine

| Oxidation Conditions[1] | No. of Runs | Time (Hours) | $O_3$ (mM) | $H_2O_2$ (mM) | DMNA found (ppm) |
|---|---|---|---|---|---|
| $UV/O_3/H_2O_2$ | 2 | 0 | 0 | 0 | 0 |
|  |  | 4 | 153 | 153 | 755 |
|  |  | 6 | 230 | 230 | 64 |
| $UV/O_3$ | 2 | 0 | 0 | 0 | 0 |
|  |  | 4 | 306 | 0 | 676 |
|  |  | 5 | 382 | 0 | 365 |
|  |  | 6 | 460 | 0 | 144 |
| $UV/H_2O_2$ | 2 | 0 | 0 | 0 | 0 |
|  |  | 4 | 0 | 306 | 370 |
|  |  | 5 | 0 | 382 | 347 |
|  |  | 6 | 0 | 400 | 316 |
| $O_3/H_2O_2$ | 1 | 0 | 0 | 0 | 0 |
|  |  | 4 | 153 | 153 | 1,187 |
|  |  | 6 | 230 | 230 | 760 |
| UV | 1 | 0 | 0 | 0 | 0 |
|  |  | 4 | 0 | 0 | 0 |
|  |  | 6 | 0 | 0 | 0 |
| Control | 1 | 0 | 0 | 0 | 0 |
|  |  | 4 | 0 | 0 | 0 |
|  |  | 6 | 0 | 0 | 0 |

[1]The Volume of oxidized UDMH solution was 2,000 ml: $O_3$ concentration in the $O_2$–$O_3$ feed gas was 2%; $O_2$–$O_3$ flow to deliver 76.5 mM (3660 mg) $O_3$/hour/2 L solution was 2 liters/min.; the $H_2O_2$ dose to deliver 76 mM (2,580 mg) $H_2O_2$/hour/2 L was 8.6 ml 30% $H_2O_2$/hour.

Although the invention has been described with reference to the presently-performed embodiment, it should be understood that various modifications can be made without departing from the spirit of the invention. Accordingly, the invention is limited only by the following claims.

We claim:

1. A method for oxidizing halogenated and/or partially oxygenated hydrocarbon constituents and/or hydrazine and hydrazine derivatives in aqueous solution comprising simultaneously exposing said aqueous solution to an amount of ozone, hydrogen peroxide and ultraviolet radiation sufficient to substantially reduce said constituents in the solution.

2. The method of claim 1 wherein said aqueous solution is ground water.

3. The method of claim 1 wherein said aqueous solution is industrial waste water.

4. The method of claim 1 wherein said aqueous solution is drinking water.

5. The method of claim 1 wherein said constituents are methylene chloride.

6. The method of claim 1 wherein said constituents are methanol.

7. The method of claim 1 wherein said method further comprises elevating the temperature of said aqueous solution during exposure to said ozone, hydrogen peroxide and ultraviolet light.

8. The method of claim 1 wherein said hydrazine derivatives are selected from the group consisting of monomethylhydrazine, unsymmetrical dimethylhydrazine and dimethylnitrosamine.

9. The method of claim 1 wherein hydrazine and hydrazine derivatives are oxidized and the aqueous solution is exposed to hydrogen peroxide, ozone and ultraviolet radiation in a molar ratio of 1:1 hydrogen peroxide to ozone.

* * * * *